(12) United States Patent
Ki et al.

(10) Patent No.: US 12,439,957 B2
(45) Date of Patent: Oct. 14, 2025

(54) CIGARETTE AND AEROSOL GENERATING APPARATUS THEREFOR

(71) Applicant: KT & G CORPORATION, Daejeon (KR)

(72) Inventors: Sung Jong Ki, Daejeon (KR); Young Joong Kim, Daejeon (KR); In Su Park, Seoul (KR); John Tae Lee, Daejeon (KR); Sun Hwan Jung, Daejeon (KR); Eun Mi Jeoung, Daejeon (KR)

(73) Assignee: KT&G CORPORATION, Daejeon (KR)

( * ) Notice: Subject to any disclaimer, the term of this patent is extended or adjusted under 35 U.S.C. 154(b) by 649 days.

(21) Appl. No.: 17/439,176

(22) PCT Filed: Nov. 27, 2020

(86) PCT No.: PCT/KR2020/017110
§ 371 (c)(1),
(2) Date: Sep. 14, 2021

(87) PCT Pub. No.: WO2021/187720
PCT Pub. Date: Sep. 23, 2021

(65) Prior Publication Data
US 2023/0099865 A1    Mar. 30, 2023

(30) Foreign Application Priority Data
Mar. 17, 2020 (KR) .................. 10-2020-0032865

(51) Int. Cl.
*A24D 1/20* (2020.01)
*A24C 5/01* (2020.01)
(Continued)

(52) U.S. Cl.
CPC .................. *A24D 1/20* (2020.01); *A24C 5/01* (2020.01); *A24D 1/002* (2013.01); *A24D 1/027* (2013.01);
(Continued)

(58) Field of Classification Search
None
See application file for complete search history.

(56) References Cited

U.S. PATENT DOCUMENTS 10,117,459 B2   11/2018   Lavanchy et al.
11,083,213 B2   8/2021    Malgat et al.
(Continued)

FOREIGN PATENT DOCUMENTS

CN    104780794 A    7/2015
CN    107087811 A    8/2017
(Continued)

OTHER PUBLICATIONS

US 11,089,812 B2, 08/2021, Zuber et al. (withdrawn)
(Continued)

*Primary Examiner* — Manley L Cummins, IV
(74) *Attorney, Agent, or Firm* — Sughrue Mion, PLLC

(57) ABSTRACT

A cigarette for an aerosol generating device includes a tobacco rod containing an aerosol generating material; and a cooling rod arranged at one side of the tobacco rod and comprising a hollow extending in a longitudinal direction of the cigarette, wherein a cooling material layer is coated on an inner surface of the cooling rod.

8 Claims, 2 Drawing Sheets

(51) Int. Cl.
  *A24D 1/00*   (2020.01)
  *A24D 1/02*   (2006.01)
  *A24D 1/04*   (2006.01)
  *A24D 3/06*   (2006.01)
  *A24F 40/20*  (2020.01)

(52) U.S. Cl.
  CPC .............. *A24D 1/04* (2013.01); *A24D 3/062* (2013.01); *A24F 40/20* (2020.01)

(56) References Cited

U.S. PATENT DOCUMENTS

| | | |
|---|---|---|
| 11,439,178 B2 | 9/2022 | Liu et al. |
| 2005/0066986 A1 | 3/2005 | Nestor et al. |
| 2014/0305448 A1 | 10/2014 | Zuber et al. |
| 2015/0027474 A1 | 1/2015 | Zuber et al. |
| 2015/0107610 A1 | 4/2015 | Metrangolo et al. |
| 2015/0257439 A1 | 9/2015 | Tritz et al. |
| 2017/0215475 A1* | 8/2017 | Besso .................... A24F 42/60 |
| 2018/0007974 A1 | 1/2018 | Thorens |
| 2018/0116275 A1* | 5/2018 | Malgat .................... A24D 1/02 |
| 2018/0146713 A1 | 5/2018 | Robinson et al. |
| 2019/0075845 A1 | 3/2019 | Malgat et al. |
| 2019/0098927 A1* | 4/2019 | Mironov ................. A24F 40/50 |
| 2020/0205467 A1* | 7/2020 | Liu ....................... A24B 15/167 |
| 2020/0352231 A1 | 11/2020 | Han et al. |
| 2021/0212357 A1* | 7/2021 | Yamamoto ............... A24D 1/20 |
| 2021/0227876 A1 | 7/2021 | Hwang et al. |
| 2021/0251281 A1 | 8/2021 | Jeoung et al. |
| 2021/0259303 A1 | 8/2021 | Hwang et al. |
| 2022/0015415 A1 | 1/2022 | Kadiric |
| 2022/0183350 A1* | 6/2022 | England ............... A24D 3/0216 |

FOREIGN PATENT DOCUMENTS

| | | |
|---|---|---|
| CN | 107750128 A | 3/2018 |
| CN | 208192123 U | 12/2018 |
| CN | 109497631 A | 3/2019 |
| CN | 110037338 A | 7/2019 |
| CN | 210043188 U | 2/2020 |
| CN | 210043189 U | 2/2020 |
| EP | 0 558 254 A2 | 9/1993 |
| GB | 2569368 A | 6/2019 |
| JP | 2015-530106 A | 10/2015 |
| KR | 10-2014-0118982 A | 10/2014 |
| KR | 10-2014-0135173 A | 11/2014 |
| KR | 10-2018-0090182 A | 8/2018 |
| KR | 10-2018-0118767 A | 10/2018 |
| KR | 10-2019-0038183 A | 4/2019 |
| KR | 10-2020-0018136 A | 2/2020 |
| WO | 2015/082649 A1 | 6/2015 |
| WO | 2016/207192 A1 | 12/2016 |
| WO | 2018/033477 A1 | 2/2018 |
| WO | 2019/096983 A1 | 5/2019 |
| WO | 2019/123048 A1 | 6/2019 |
| WO | 2020/009415 A1 | 1/2020 |
| WO | 2020/009416 A1 | 1/2020 |
| WO | 2020/025731 A1 | 2/2020 |
| WO | 2020/032610 A1 | 2/2020 |

OTHER PUBLICATIONS

Machine Translation of CN 110037338 A (Year: 2024).*
English Translation of WO_2020032610 (WO_2020032610 was already made of record by Applicant's IDS filed on May 25, 2022) (Year: 2020).*
Written Opinion for PCT/KR2020/017110, dated Mar. 12, 2021.
International Search Report for PCT/KR2020/017110, dated Mar. 12, 2021.
Extended European Search Report dated Feb. 28, 2022, issued in European Application No. 20922469.0.
Office Action issued Dec. 21, 2021 in Korean Application No. 10-2020-0032865.
Chinese Office Action dated Dec. 28, 2023 in Application No. 202080044055.6.
Office Action dated Oct. 25, 2022, issued in Japanese Application No. 2021-563138.
Office Action issued Jun. 9, 2022 in Korean Application No. 10-2020-0032865.
Chinese Office Action issued Sep. 26, 2023 in Application No. 202080044055.6.
Japanese Office Action issued Aug. 22, 2023 in Application No. 2021-563138.
Office Action issued Apr. 23, 2023 in Chinese Application No. 202080044055.6.
Office Action issued May 9, 2023 in Japanese Application No. 2021-563138.
Notice of Termination of Reconsideration dated Mar. 19, 2024 in Japanese Application No. 2021-563138.

* cited by examiner

[Fig. 1]
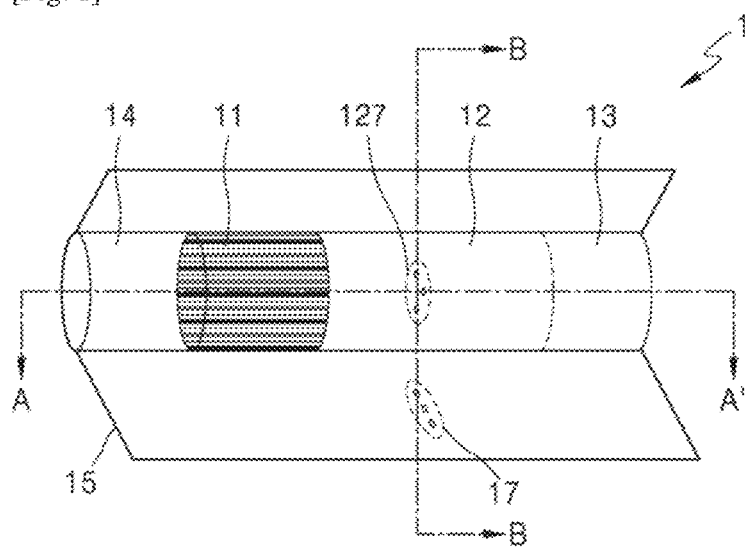
[Fig. 2]
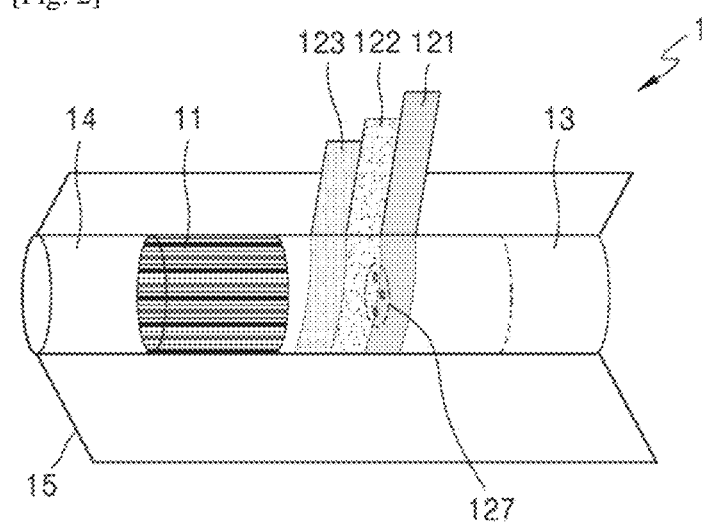
[Fig. 3]
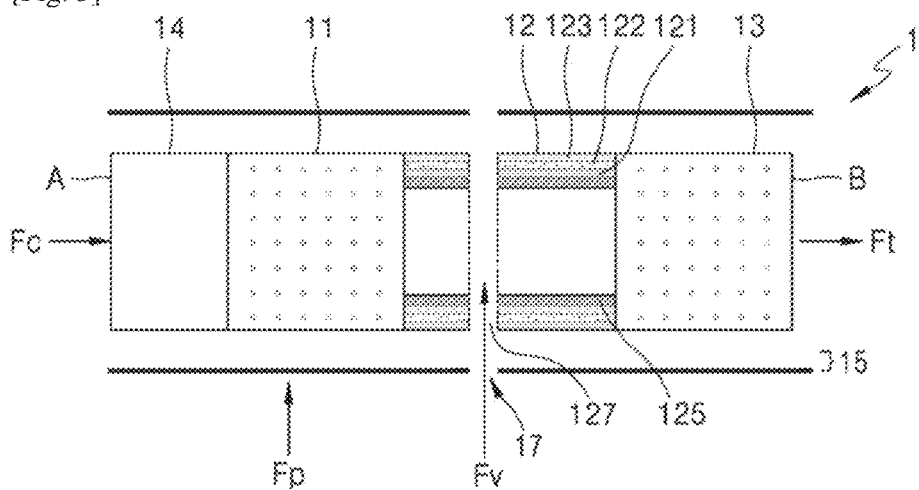

[Fig. 4]
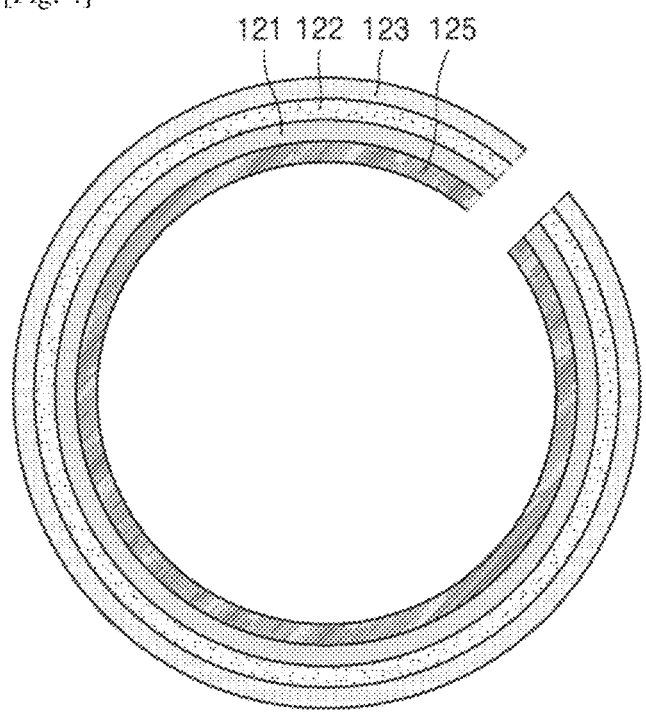
[Fig. 5]
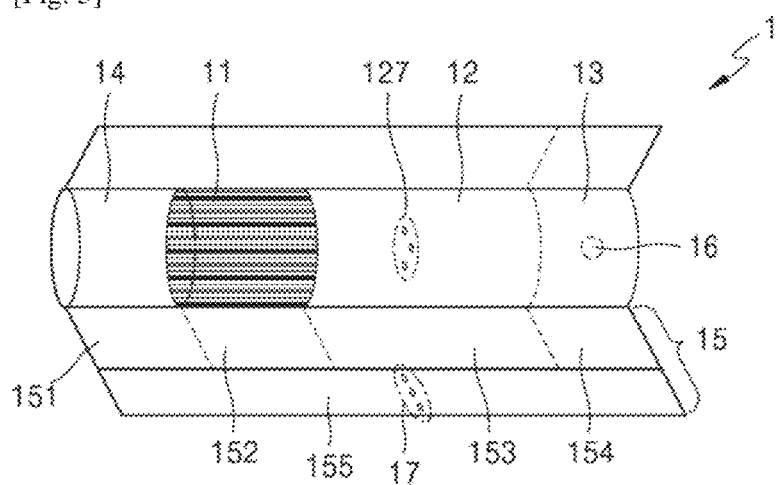
[Fig. 6]
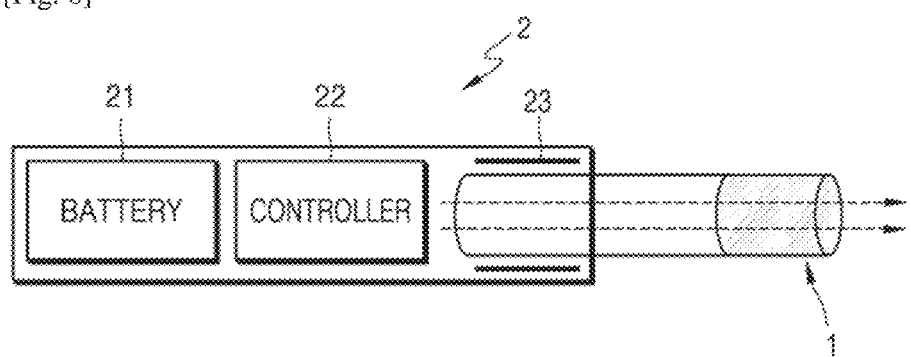

CIGARETTE AND AEROSOL GENERATING APPARATUS THEREFOR

CROSS REFERENCE TO RELATED APPLICATIONS

This application is a National Stage of International Application No. PCT/KR2020/017110 filed Nov. 27, 2020, claiming priority based on Korean Patent Application No. 10-2020-0032865 filed Mar. 17, 2020.

TECHNICAL FIELD

One or more embodiments relate to a cigarette and an aerosol generating apparatus therefor.

BACKGROUND ART

Recently, the demand or alternatives to traditional cigarettes has increased. For example, there is growing demand for an aerosol generating device that generates an aerosol by heating an aerosol generating material contained in cigarettes, rather than by combusting cigarettes. Accordingly, studies on a heating-type cigarette and a heating-type aerosol generating device have been actively conducted.

DISCLOSURE OF INVENTION

Technical Problem

There is a need for a cigarette containing an aerosol generating material, which effectively cools the heated aerosol before being inhaled by the user.

Solution to Problem

According to one or more embodiments, a cigarette for an aerosol generating device may include: a tobacco rod containing an aerosol generating material; and a cooling rod arranged at one side of the tobacco rod and comprising a hollow extending in a longitudinal direction of the cigarette, wherein a cooling material layer is coated on an inner surface of the cooling rod.

According to one or more embodiments, a method of manufacturing a cigarette for an aerosol generating device includes: coating one side of a plate-shaped support material layer with a cooling material layer; manufacturing a cooling rod by bending the support material layer such that the one side faces inward and both ends of the support material layer meet; arranging a tobacco rod containing an aerosol generating material at one side of the cooling rod; and surrounding the cooling rod and the tobacco rod with a packaging material.

According to one or more embodiments, an aerosol generating apparatus includes: a base; a battery; a heating unit configured to heat a cigarette including a tobacco rod and a cooling rod adjacent to a front end of the tobacco rod; and a controller configured to control power supplied from the battery to the heating unit, wherein a hollow extending in a longitudinal direction of the cigarette is formed inside the cooling rod, and an inner surface of the cooling rod is coated with a cooling material layer.

Advantageous Effects of invention

According to one or more embodiments, a cooling effect of the cooling rod may be improved, and the manufacture of the cooling rod may be facilitated.

BRIEF DESCRIPTION OF DRAWINGS

FIG. 1 is a perspective view of a cigarette according to an embodiment;

FIG. 2 is a view illustrating a configuration of a cooling rod of the cigarette illustrated in FIG. 1;

FIG. 3 is a cross-sectional view of the cigarette taken along line A-A' of FIG. 1;

FIG. 4 is a cross-sectional view of the cigarette taken along line B-B' of FIG. 1; and FIG. 5 is a perspective view of a cigarette according to another embodiment.

FIG. 6 is a diagram illustrating an embodiment in which a cigarette is inserted into an aerosol generating device.

BEST MODE FOR CARRYING OUT THE INVENTION

According to one or more embodiments, a cigarette for an aerosol generating device may include: a tobacco rod containing an aerosol generating material; and a cooling rod arranged at one side of the tobacco rod and comprising a hollow extending in a longitudinal direction of the cigarette, wherein a cooling material layer is coated on an inner surface of the cooling rod.

The cooling rod may be manufactured by winding a plate-shaped support material layer.

The cooling rod may include a laminate of a plurality of support material layers stacked in a radial direction of the cigarette.

The plurality of support material layers may include inner paper layer and outer paper layer arranged further outside than the inner paper layer, and the inner paper layer and the outer paper layer have different basis weights.

The cooling material layer may be made of a waterproof material.

The cooling material layer may include polylactic acid (PLA) as a material.

The cooling rod may have a thickness of about 200 μm to about 600 μm.

At least one perforation may be formed in the cooling rod such that external air flows into the hollow through the perforation.

The cigarette may further include a filter rod arranged at a first side of the cooling rod, wherein the tobacco rod is located on a second side of the cooling rod, and the perforation is arranged closer to the second side than to the first side.

A first air flow amount may be discharged through one end of the cigarette, and a second air flow amount may flow into the cigarette through the perforation along a radial direction of the cigarette, wherein an air dilution rate, which is a ratio of the second air flow amount to the first air flow amount, is about 30% to about 90%.

According to one or more embodiments, a method of manufacturing a cigarette for an aerosol generating device includes: coating one side of a plate-shaped support material layer with a cooling material layer; manufacturing a cooling rod by bending the support material layer such that the one side faces inward and both ends of the support material layer meet: arranging a tobacco rod containing an aerosol generating material at one side of the cooling rod; and surrounding the cooling rod and the tobacco rod with a packaging material.

According to one or more embodiments, an aerosol generating apparatus includes: a base; a battery; a heating unit configured to heat a cigarette including a tobacco rod and a cooling rod adjacent to a front end of the tobacco rod; and a controller configured to control power supplied from the battery to the heating unit, wherein a hollow extending in a longitudinal direction of the cigarette is formed inside the cooling rod, and an inner surface of the cooling rod is coated with a cooling material layer.

MODE FOR THE INVENTION

With respect to the terms used to describe the various embodiments, general terms which are currently and widely used are selected in consideration of functions of structural elements in the various embodiments of the present disclosure. However, meanings of the terms can be changed according to intention, a judicial precedence, the appearance of new technology, and the like. In addition, in certain cases, a term which is not commonly used can be selected. In such a case, the meaning of the term will be described in detail at the corresponding portion in the description of the present disclosure. Therefore, the terms used in the various embodiments of the present disclosure should be defined based on the meanings of the terms and the descriptions provided herein.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and operation and can be implemented by hardware components or software components and combinations thereof.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

It will be understood that when an element or layer is referred to as being "over," "above," "on," "connected to" or "coupled to" another element or layer, it can be directly over, above, on, connected or coupled to the other element or layer or intervening elements or layers may be present, In contrast, when an element is referred to as being "directly over," "directly above," "directly on," "directly connected to" or "directly coupled to" another element or layer, there are no intervening elements or layers present. Like numerals refer to like elements throughout.

As used herein, "an aerosol generating article" may refer to a material capable of generating an aerosol, such as a cigarette and a cigar. The aerosol generating article may include an aerosol generating material or an aerosol forming substrate. Also, the aerosol generating article may include a solid material based on a tobacco raw material such as a reconstituted tobacco sheet, a pipe tobacco, or a reconstituted tobacco. The aerosol may include a volatile compound.

In addition, as used herein, "upstream" or "forward" refers to a direction away from the mouth of a user who smokes on the aerosol generating device, and "downstream" or "backward" refers to a direction closer to the mouth of the user who smokes on the aerosol generating device.

Hereinafter, the present disclosure will now be described more fully with reference to the accompanying drawings, in which exemplary embodiments of the present disclosure are shown such that one of ordinary skill in the art may easily work the present disclosure. The disclosure may, however, be embodied in many different forms and should not be construed as being limited to the embodiments set forth herein.

Hereinafter, embodiments of the present disclosure will be described in detail with reference to the drawings.

FIG. 1 is a perspective view of a cigarette 1 according to one embodiment.

Referring to FIG. 1, the cigarette 1 may include a tobacco rod 11 and a cooling rod 12.

As the cigarette 1 is heated by a heater of an aerosol generating device (e.g., the aerosol generating device 2 in FIG. 6), an aerosol is generated in the tobacco rod 11. The generated aerosol may be delivered to the cooling rod 12 along an air flow path and cooled while passing the cooling rod. Then, the aerosol is inhaled into the mouth of a user through the filter rod 13.

The tobacco rod 11 may include a tobacco material and an aerosol generating material. The tobacco rod 11 may include tobacco and/or nicotine. The nicotine may be acquired by shaping or reconstituting tobacco leaves. For example, the tobacco rod 11 may be formed as a sheet or a strand. Also, the tobacco rod 11 may be formed as a pipe tobacco, which is formed of tiny bits cut from a tobacco sheet.

As another example, the tobacco rod 11 may include one of free base nicotine, nicotine salt, and a combination thereof. In detail, nicotine may be naturally generated nicotine or synthesized nicotine.

For example, the tobacco rod 11 may include at least one of glycerin, propylene glycol, ethylene glycol, dipropylene glycol, diethylene glycol, triethylene glycol, tetraethylene glycol, and oleyl alcohol, but it is not limited thereto. Also, the tobacco rod 11 may include other additives, such as flavors, a wetting agent, and/or organic acid. Also, the tobacco rod 11 may include a flavored liquid, such as menthol or a moisturizer, which is injected to the tobacco rod 11.

According to embodiments, the tobacco rod 11 may be surrounded by a heat conductive material. For example, the thermally conductive material may be aluminum (Al), copper (Cu), or a metal alloy including aluminum or copper.

The cooling rod 12 may cool the aerosol delivered from a tobacco medium. The cooling rod 12 may be located on one side of the tobacco rod 11. For example, the cooling rod 12 may be adjacent to a rear end of the tobacco rod 11. Therefore, the cooling rod 12 may cool the aerosol that is generated as a heating unit (e.g., the heating unit 23 in FIG. 6) heats the tobacco rod 11. Then, the user may inhale aerosol cooled to an appropriate temperature.

The cooling rod 12 may be an air flow delivery element which provides a path along which air discharged from the tobacco rod 11 moves. Thereby, the cooling rod 12 delivers the air from its front end to its rear end. The cooling rod 12 may include an empty space through which air may move. A porosity of the cooling rod 12 may be variously determined by the empty space. The porosity may be a ratio of an area of the empty space to the entire cross-sectional area of the cooling rod 12. The porosity may be designed in consideration of a cooling effect of an air flow, a transfer amount of nicotine, or the like.

The cooling rod 12 may be a tube-type or pipe-type rod having a hollow formed therein along a longitudinal direction of the cigarette 1. For example, the cooling rod 12 may be a tube-type structure having a hollow inside. The cooling rod 12 may prevent an internal material of the tobacco rod 11 from being pushed back when the heating unit 23 is inserted in the aerosol generating device, and may generate a cooling effect of aerosol.

Attempts have been made to use a fiber drawn from polymer as a cooling material of a cigarette. For example, some cigarettes use a tube-type cooling element woven by using polymer. In this case, the manufacturing process of the cooling element is restricted due to constraints or limitations due to physical properties of polymer. For example, when a cooling element is woven by using polymer, it is difficult to adjust a wall thickness of the cooling element, particularly when the wall is required to be very thin.

According to one or embodiments, the cooling rod 12 may be manufactured as a tube type with a material selected from various materials, and restrictions on the manufacturing process of the cooling rod 12 may be relieved according to the selected material.

According to one or more embodiments, the cooling rod 12 may be made of a material having a strong supporting force, Therefore, the cooling rod 12 may effectively prevent an internal material of the tobacco rod 11 from being pushed back when the heating unit is inserted into the cigarette. As a result, the manufacturing process of the cooling rod 12, such as minimizing a thickness of a tube wall and increasing an inner diameter of a hollow may be facilitated.

According to one or more embodiments, the cooling rod 12 may be made of a paper material. The basis weight and thickness of the paper material may be appropriately determined to secure a supporting force. The cooling rod 12 may be manufactured by laminating a plurality of paper material layers to secure the supporting force. For example, the cooling rod 12 may have a thickness of about 200 μm to 600 μm. This will be described in more detail with reference to FIGS. 2 through 4.

The components of the cigarette 1 are not limited to the tobacco rod 11, the cooling rod 12, and the like described above. According to one or embodiments, the cigarette 1 may further include at least some of a filter rod 13, a liquid rod 14, a front-end plug, a wrapper 15, and the like.

The liquid rod 14 may include a liquid composition. The liquid rod 14 may include a crimped sheet made of an absorbent material having a property of absorbing and retaining a liquid composition, a container including a liquid composition, or the like.

The filter rod 13 may filter a certain component included in an aerosol. The filter rod 13 may be a filter that blocks certain components, such as foreign substances, in a process of passing air exiting the tobacco rod 11 through the filter rod 13.

The front-end plug may be located at the front end of the cigarette 1. The front-end plug may prevent the tobacco rod 11 from falling off and prevent the liquefied aerosol from leaking into the aerosol generating device from the tobacco rod 11, during smoking.

The cigarette 1 may be packaged via at least one wrapper 15. The wrapper 15 may surround the cigarette 1. According to one embodiment, when at least one perforation 127 is formed at the cooling rod 12, and at least one perforation 17 may be formed at the wrapper 15 such that the position of perforation 127 correspond to the position of the cooling rod 12 when the wrapper 15 is surrounding the cigarette 1.

The filter rod 13, the front-end plug, and the wrapper 15 of the cigarette 1 will be described in more detail later with reference to FIG. 5.

FIG. 2 is a view illustrating a configuration of the cooling rod 12 of the cigarette 1 illustrated in FIG. 1.

Referring to FIG. 2, the cooling rod 12 may be manufactured by winding a plate-shaped support material. The plate-shaped support material may be wound such that both ends meet, thereby forming a tubular shape having a hollow therein.

The cooling rod 12 may include a plurality of support material layers that are laminated. Accordingly, the cooling rod 12 may have a minimized thickness and simultaneously have a strengthened supporting force in a longitudinal direction. Also, the cooling rod 12 may have a strengthened supporting force with respect to a bending moment generated by winding the plate-shaped support material.

The number of support material layers, a material constituting the support material layers, and the like may be determined according to a manufacturing process, physical property requirements of the cooling rod 12, and the like. For example, physical properties of a material, such as the number, basis weight, smoothness, density, thickness, and the degree of adsorbing an adhesive, may be determined according to the manufacturing process, physical property requirements of the cooling rod 12, and the like.

When the cooling rod 12 is made of one support material layer, bending of the support material layer may not be facilitated due to great thickness and heavy basis weight. Therefore, the cooling rod 12 may be made of a plurality of support material layers, each having relatively thin thickness and light basis weight. As a result, bending of each of the support material layers and the manufacture of the cooling rod 12 are facilitated.

According to an embodiment, the cooling rod 12 may include inner paper 121, intermediate paper 122, and outer paper 123 according to an order in which the support. material layers are stacked. According to another embodiment, the cooling rod 12 may be made of merely one or two support material layers selected from the inner paper 121, the intermediate paper 122, and the outer paper 123.

The inner paper 121 may be the innermost support material layer, and the intermediate paper 122 may be located on the outside of the inner paper 121. The outer paper 123 may be the outermost support material layer located on the outside of the intermediate paper 122. For example, a basis weight of the inner paper 121 may be about 70 g/m² to about 150 g/m², and a thickness of the inner paper 121 may be about 100 μm to about 200 μm. Also, a basis weight of the intermediate paper 122 may be about 100 g/m² to about 150 g/m², a thickness of the intermediate paper 122 may be about 100 μm to about 200 μm. Also, a basis weight of the outer paper 123 may be about 40 g/m² to about 80 g/m², and a thickness of the outer paper 123 may be about 50 μm to about 150 μm.

FIG. 3 is a cross-sectional view of the cigarette 1 taken along line A-A' of FIG. 1. FIG. 4 is a cross-sectional view of the cigarette 1 taken along line B-B' of FIG. 1.

Referring to FIGS. 3 and 4, the cooling rod 12 may be made of a plurality of support material layers that are laminated together in a radial direction of the cigarette 1.

The cooling material layer 125 may be coated on an inner surface of the cooling rod 12 having a shape of a hollow tube. In other words, assuming that the inner paper 121 is the innermost layer of the support material layers of the cooling rod 12, the cooling material layer 125 may be coated on an inner surface of the inner paper 121 of the cooling rod 12.

To this end, the inner paper 121 of the cooling rod 12 may have a physical property that facilitates coating of the cooling material layer 125.

The cooling material layer 125 may be made of a cooling material capable of cooling an air flow and an aerosol. For example, the cooling material layer 125 may be made of a material selected from the group consisting of polyethylene (PE), polypropylene (PP), polyvinyl chloride (PVC), polyethylene terephthalate (PET), polylactic acid. (PLA, polylactide), cellulose acetate (CA), and aluminum foil. According to an embodiment, the cooling material layer 125 may cool the air flow and the aerosol passing through a hollow of the cooling rod 12 as the cooling material composed of polymer material absorbs heat from the air flow and the aerosol.

A cooling material coated on the inner surface of the cooling rod 12 may be waterproof, thereby waterproofing the support material layers. As a result, the durability of the cooling rod 12 may be improved. Also, the aerosol may be effectively delivered to the mouth without being absorbed into the cooling rod 12.

The cooling rod 12 including a hollow having an inner surface coated with the cooling material may be manufactured by coating one side of the plate-shaped support material with the cooling material and bending the support material such that the one side of the support material coated with the cooling material faces inward. The cooling rod 12 may be arranged with the tobacco rod 11 in a longitudinal direction, and the cooling rod 12 and the tobacco rod 11 may be packaged with the wrapper 15.

According to an embodiment, the cooling material layer 125 may have a thickness of about 20 μm to about 50 μm and a basis weight of about 30 g/m² to about 70 g/m².

According to an embodiment, at least one perforation 127 may be formed in a tube wall of the cooling rod 12. The perforation 127 may penetrate the cooling rod 12 in the radial direction such that external air may be introduced into the hollow of the cooling rod 12 through the perforation 127.

The air and aerosol flowing from the tobacco rod 11 along the longitudinal direction through the hollow may be mixed with air introduced in the radial direction through the perforation 127 in the cooling rod 12.

As the perforation 12.7 is formed in the cooing rod 12, the aerosol may be effectively cooled in the cooling rod 12. In a case where the perforation 17 is formed in the tobacco rod 11 other than in the cooling rod 12, the temperature in the tobacco rod 11 may be decreased, and thus, an aerosol may not be effectively generated.

The perforation 127 may be formed at the upstream portion of the cooling rod 12. In other words, the perforation 127 may be arranged closer to the tobacco rod 11 than to the filter rod 13 such that a distance from the perforation 127 to the filter rod 13 is greater than a distance from the perforation 127 to the tobacco rod 11.

Since the inflow of air through the perforation 127 may start from the upstream side of the cooling rod 12, a flow rate of an air flow including the aerosol may decrease, and the air flow stays in the cooling rod 12 for longer, thereby efficiently cooling the air flow.

As shown in FIG. 3, according to the inhalation of a user, an air flow having a first air flow amount Fc may flow into the cigarette 1 through a front end A of the cigarette 1.

Also, an air flow having a second air flow amount Fv may be introduced along the radial direction of the cigarette 1 through the perforation 127 formed in the cooling rod 12.

The second air flow amount Fv may be determined according to the size, number, shape, arrangement, etc. of the perforations 127.

In addition, when the wrapper 15 is porous, an air flow having a third air flow amount Fp may be introduced through the wrapper 15 of the cigarette 1. The third air flow amount Fp may be a very small amount, and may be neglected according to embodiments.

An air flow having a fourth air flow amount Ft may be discharged through a rear end B of the cigarette 1 and provided to the user. Here, the fourth air flow amount Ft may be equal to a sum of the first air flow amount Fc, the second air flow amount Fv, and the third air flow amount Fp.

An air dilution rate is expressed as a percentage of an amount of air introduced from the outside when an air flow is inhaled through the cigarette 1. The air dilution rate dilutes the aerosol, reduces a flow rate, and affects the temperature and filtration efficiency of an air flow.

The air dilution rate may be defined as a ratio of a sum of the second air flow amount Fv and the third air flow amount Fp to the fourth air flow amount Ft. According to embodiments, the air dilution rate may be defined as a ratio of the second air flow amount Fv to the fourth air flow amount Ft.

For standardizing the air dilution rate, according to embodiments, the air dilution rate may be measured in a state in which the fourth air flow amount Ft is fixed to 17.5 ml/s, Here, an air dilution rate of the cigarette 1 may be about 30% to about 90%.

When the air dilution rate exceeds 90%, an amount of air flow including the aerosol may decrease rapidly. On the other hand, when the air dilution rate is less than 30%, the air flow including the aerosol may not be properly cooled, and the cooling rod 12 and the filter rod 13 may melt.

The number of the perforations 127 may differ according to embodiments. For example, three or nine perforations 127 may be formed. Here, a distance between the perforations 127 may or may not be uniform according to embodiments.

FIG. 5 is a perspective view of a cigarette 1 according to another embodiment,

The description provided above with reference to FIG. 1 may be applied to the cigarette 1 illustrated in FIG. 5. Additional features that may be included in the cigarette 1 of FIG. 1 will be described with reference to FIG. 5.

A filter rod 13 may filter a certain component included in the aerosol. The filter rod 13 may be a filter that blocks certain components, such as foreign substances, in a process of passing air exiting a tobacco rod 11.

Shapes of the filter rod 13 are not limited. For example, the filter rod 13 may be a cylinder-type rod or a tube-type rod having a hollow inside.

According to one embodiment, the filter rod 13 may include a cellulose acetate filter.

The filter rod 13 may be manufactured to generate flavors by injecting a flavoring liquid onto the filter rod 13 in a process of manufacturing the filter rod 13. In some embodiments, an additional fiber coated with a flavoring liquid may be inserted into the filter rod 13. Aerosol generated in the tobacco rod 11 is cooled by passing through the cooling rod 12, and the cooled aerosol is delivered to a user through the filter rod 13. Therefore, when a flavoring element is added to the filter rod 13, the persistence of flavor delivered to the user may be enhanced.

A liquid rod 14 may retain a liquid composition that is an aerosol generating material. As the liquid rod 14 is heated by the aerosol generating device 2, the liquid composition may be vaporized and provided to the user in the form of aerosol.

The liquid rod 14 may not include nicotine. Also, the liquid rod 14 may include an aerosol generating material from which nicotine is excluded. For example, the liquid rod 14 may include at least one of glycerin, propylene glycol, ethylene glycol, dipropylene glycol, diethlyene glycol, triethylene glycol, tetraethylene glycol, and oleyl alcohol but is not limited thereto. For example, the liquid rod 14 may include a material in which glycerin and propylene glycol are mixed in a ratio of about 8:2. However, the liquid rod 14 is not limited to the above mixture ratio. Also, the liquid rod 14 may include other additives, such as flavors, a wetting agent, and/or organic acid. In addition, the liquid rod 14 may include a flavoring liquid such as menthol or a moisturizer.

The liquid composition may include water, a solvent, ethanol, plant extract, spices, flavorings, or a vitamin mixture. The spices may include menthol, peppermint, spearmint oil, and various fruit-flavored ingredients but are not limited thereto. The flavorings may include ingredients capable of providing various flavors or tastes to the user. Vitamin mixtures may be a mixture of at least one of vitamin A, vitamin B, vitamin C, and vitamin E, but are not limited thereto. Also, the liquid composition may include an aerosol forming substance, such as glycerin and propylene glycol.

The liquid rod 14 may include a crimped sheet impregnated with the aerosol generating material. In addition, other additives, such as flavors, a wetting agent, and/or organic acid, and a flavoring liquid may be included in the liquid rod 14 while absorbed into the crimped sheet.

The crimped sheet may be a sheet made of a polymer material. For example, the polymer material may include at least one of cellulose acetate, lyocell, and polylactic acid. For example, the crimped sheet may be a paper sheet that does not generate off-flavor even when heated at a high temperature, but is not limited thereto.

A front-end plug may be located at a front end of the cigarette 1. The front-end plug may prevent the tobacco rod 11 from falling off and prevent a liquefied aerosol from flowing into the aerosol generating device from the tobacco rod 11, during smoking.

The front-end plug may include an empty space through which air may move. The empty space may be a hollow or a passage having a polygonal cross section and extending in a longitudinal direction. In some embodiments, the empty space may be formed by a plurality of small holes if the front-end plug is made of a porous material.

A wrapper 15 may surround the cigarette 1. The wrapper 15 may include a plurality of wrappers surrounding respective segments.

For example, the liquid rod 14 may be packaged by a first wrapper 151, the tobacco rod 11 may be packaged by a second wrapper 152, the cooling rod 12 may be packaged by a third wrapper 153, and the filter rod may be packaged by a fourth wrapper 154. Also, the entire cigarette 1 may be packaged by a fifth wrapper 155.

The first wrapper 151 may be formed by bonding metal foil such as aluminum foil with general filter wrapping paper. The second wrapper 152 and the third wrapper 153 may be made of general filter wrapping paper. For example, the second wrapper 152 and the third wrapper 153 may be porous wrapping paper or non-porous wrapping paper. Here, the non-porous wrapping paper may have a porosity less than or equal to 200 coresta unit (CU), and the porous wrapping paper may have a porosity exceeding 200 CU.

At least one perforation 17 may be formed in the wrapper 15. Air from the outside of the cigarette 1 may be introduced into the cigarette 1 through the perforation 17 formed in the wrapper 15.

The perforation 17 may be formed at various locations. For example, the perforation 17 may be formed in the fifth wrapper 155. Air introduced through the fifth wrapper 155 may pass through an inner wrapper surrounded by the fifth wrapper 155 and flow into the cigarette 1.

The perforation 17 may be formed in an area surrounding the filter rod 13 and/or an area surrounding the cooling rod 12.

According to one embodiment, when a perforation 127 is formed at the cooling rod 12, the perforation 17 may be formed at an area of the wrapper 15 such that the perforation 17 faces the perforation 127 of the cooling rod 12 when the wrapper 15 is surrounding the cigarette 1.

The air introduced through the perforation 17 may cool the heated air exiting the tobacco rod 11 before it reaches the mouth of the user, and may cool the surface of the cigarette 1.

The number of perforations 17 may differ according to embodiments, For example, three or nine perforations 17 may be formed. Here, a distance between the perforations 17 may or may not be uniform.

FIG. 6 is a view illustrating an example in which a cigarette 1 is inserted into an aerosol generating device 2.

Referring to FIG. 6, the aerosol generating device 2 may include a battery 21, a controller 22, and a heater unit 23.

FIG. 6 only shows the aerosol generating device 2 with some elements related to the embodiment. Therefore, it will be understood by one of ordinary skill in the art related to the present embodiment that other components may be further included in the aerosol generating device 2, in addition to the components illustrated in FIG. 6.

Also, FIG. 6 illustrates that the aerosol generating device 2 includes the heater unit 23. However, the heating unit 23 may be omitted according to embodiments.

FIG. 6 illustrates that the battery 21, the controller 22, and the heating unit 23 are arranged in series. However, the internal structure of the aerosol generating device 2 is not limited to the arrangements illustrated in FIG. 6. In other words, according to the design of the aerosol generating device 2, the battery 21, the controller 22, the heating unit 23, and a vaporizer may be arranged in parallel or may be differently arranged.

When the cigarette 1 is inserted into the aerosol generating device 2, the aerosol generating device 2 may operate the heating unit 23 and/or the vaporizer to generate an aerosol from the cigarette 1 and/or the vaporizer. The aerosol generated by the heating unit 23 and/or the vaporizer is delivered to a user by passing through the cigarette 1.

As necessary, even when the cigarette 1 is not inserted into the aerosol generating device 2, the aerosol generating device 2 may heat the heating unit 23.

The battery 21 may supply power to be used for the aerosol generating device 2 to operate. For example, the battery 21 may supply power to heat the heating unit 23 or the vaporizer, and may supply power for operating the controller 22. Also, the battery 21 may supply power for operations of a display, a sensor, a motor, etc. mounted in the aerosol generating device 2.

The controller 22 may generally control operations of the aerosol generating device 2. In detail, the controller 22 may control not only operations of the battery 21, the heating unit 13, and the vaporizer, but also operations of other components included in the aerosol generating device 2. Also, the controller 22 may check a state of each of the components of the aerosol generating device 2 to determine whether or not the aerosol generating device 2 is able to operate.

The controller 12 may include at least one processor. A processor can be implemented as an array of a plurality of logic gates or can be implemented as a combination of a general-purpose microprocessor and a memory in which a program executable in the microprocessor is stored. It will be understood by one of ordinary skill in the art that the processor can be implemented in other forms of hardware.

The heating unit 23 may be heated by the power supplied from the battery 21. For example, when the cigarette 1 is inserted into the aerosol generating device 2, the heating unit 23 may be located outside the cigarette 1. Thus, the heated heating unit 23 may increase a temperature of an aerosol generating material in the cigarette 1.

The heating unit 23 may include an electro-resistive heater. For example, the heating unit 23 may include an electrically conductive track, and the heating unit 23 may be heated when currents flow through the electrically conductive track. However, the heating unit 23 is not limited to the example described above and any type of heaters capable of being heated to a desired temperature may be used. Here, the desired temperature may be pre-set in the aerosol generating device 2 or may be set manually by a user.

As another example, the heating unit 23 may include an induction heater. In detail, the heating unit 23 may include an electrically conductive coil for heating a cigarette 1 in an induction heating method, and the cigarette 1 may include a susceptor which may be heated by the induction heater For example, the heating unit 23 may include a tube-type heating element, a plate-type heating element, a needle-type heating element, or a rod-type heating element, and may heat the inside or the outside of the cigarette 1, according to the shape of the heating element.

Also, the aerosol generating device 2 may include a plurality of heating units 23. Here, the plurality of heating unit 23 may be inserted into the cigarette 1 or may be arranged outside the cigarette 1. Also, some of the plurality of heating units 23 may be inserted into the cigarette 1 and the others may be arranged outside the cigarette 1. In addition, the shape of the heating unit 23 is not limited to the shapes illustrated in FIG. 6 and may include various shapes.

The vaporizer may generate an aerosol by heating a liquid composition and the generated aerosol may pass through the cigarette 1 to be delivered to a user. In other words, the aerosol generated via the vaporizer may move along an air flow passage of the aerosol generating device 2, and the air flow passage may be configured such that the aerosol generated via the vaporizer passes through the cigarette 1 to be delivered to the user.

The aerosol generating device 2 may further include other components in addition to the battery 21, the controller 22, the heating unit 23, and the vaporizer. For example, the aerosol generating device 2 may include a display capable of outputting visual information and/or a motor for outputting haptic information. Also, the aerosol generating device 2 may include at least one sensor (e.g., a puff detecting sensor, a temperature detecting sensor, a cigarette insertion detecting sensor, etc.). Also, the aerosol generating device 2 may have a structure which allows external air to be introduced or internal air to be discharged, with the cigarette 1 being inserted into the aerosol generating device 2.

Although not illustrated in FIG. 6, the aerosol generating device 2 and an additional cradle may form together a system. For example, the cradle may be used to charge the battery 21 of the aerosol generating device 2. The heating unit 23 may be heated while the cradle and the aerosol generating device 2 are coupled to each other.

The cigarette 1 may include a tobacco rod including a tobacco material and an aerosol generating material, a cooling rod cooing aerosol, and a filter rod including a filter and the like.

The tobacco rod may be fully inserted into the aerosol generating device 2, and the cooling rod or filter rod may be exposed to the outside. Alternatively, only a portion of the tobacco rod may be inserted into the aerosol generating device 2. In another example, the entire tobacco rod and a portion of the cooling rod (or filter rod) may be inserted into the aerosol generating device 2. The user may puff the aerosol while holding the filter rod by the mouth of the user. In this case, the aerosol is generated by the external air passing through the tobacco rod, and the generated aerosol passes through the cooling rod and filter rod and is delivered to the user's mouth For example, the external air may flow into at least one air passage formed in the aerosol generating device 2. For example, opening and closing of the air passage and/or a size of the air passage may be adjusted by the user. Accordingly, the amount of smoke and a smoking impression may be adjusted by the user. As another example, the external air may flow into the cigarette 1 through at least one hole formed in a surface of the cigarette 1.

At least one of the components, elements, modules or units (collectively "components" in this paragraph) represented by a block in the drawings, such as the controller 22 in FIG. 6, may be embodied as various numbers of hardware, software and/or firmware structures that execute respective functions described above, according to an exemplary embodiment. For example, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Further, although a bus is not illustrated in the above block diagrams, communication between the components may be performed through the bus. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

Those of ordinary skill in the art related to the present embodiments may understand that various changes in form and details can be made therein without departing from the scope of the characteristics described above. The disclosed methods should be considered in a descriptive sense only and not for purposes of limitation. The scope of the present disclosure is defined by the appended claims rather than by the foregoing description, and all differences within the scope of equivalents thereof should be construed as being included in the present disclosure.

The invention claimed is:

1. A cigarette for an aerosol generating device, comprising:
 a tobacco rod containing an aerosol generating material;
 a cooling rod arranged at a first side of the tobacco rod and comprising a hollow extending in a longitudinal direction of the cigarette; and
 a liquid rod arranged at a second side of the tobacco rod and comprising an aerosol generating material excluding nicotine,
 wherein a cooling material layer is coated on an inner surface of the cooling rod,
 wherein the cooling rod includes a laminate of a plurality of support material layers stacked in a radial direction of the cigarette,
 wherein the laminate of the plurality of support material layers include an inner paper layer, an intermediate paper layer, and an outer paper layer,
 wherein a basis weight of the inner paper layer is about 70 g/m$^2$ to 150 g/m$^2$, a basis weight of the intermediate paper layer is about 100 g/m$^2$ to 150 g/m$^2$, and a basis weight of the outer paper layer is about 40 g/m$^2$ to 80 g/m$^2$.

2. The cigarette of claim 1, wherein the cooling rod further includes a plate-shaped support material layer.

3. The cigarette of claim 1, wherein the cooling material layer is made of a waterproof material.

4. The cigarette of claim 1, wherein the cooling material layer includes polylactic acid (PLA).

5. The cigarette of claim 1, wherein the cooling rod has a thickness of about 200 μm to about 600 μm.

6. The cigarette of claim 1, wherein at least one perforation is formed in the cooling rod such that external air flows into the hollow through the at least one perforation.

7. The cigarette of claim 6, further comprising a filter rod arranged at a first side of the cooling rod, wherein
 the tobacco rod is located on a second side of the cooling rod, and
 the at least one perforation is arranged closer to the second side than to the first side.

8. The cigarette of claim 6, wherein
 a first air flow amount is discharged through one end of the cigarette,
 a second air flow amount flows into the cigarette through the at least one perforation along the radial direction of the cigarette, and
 an air dilution rate, which is a ratio of the second air flow amount to the first air flow amount, is about 30% to about 90%.

* * * * *